UNITED STATES PATENT OFFICE.

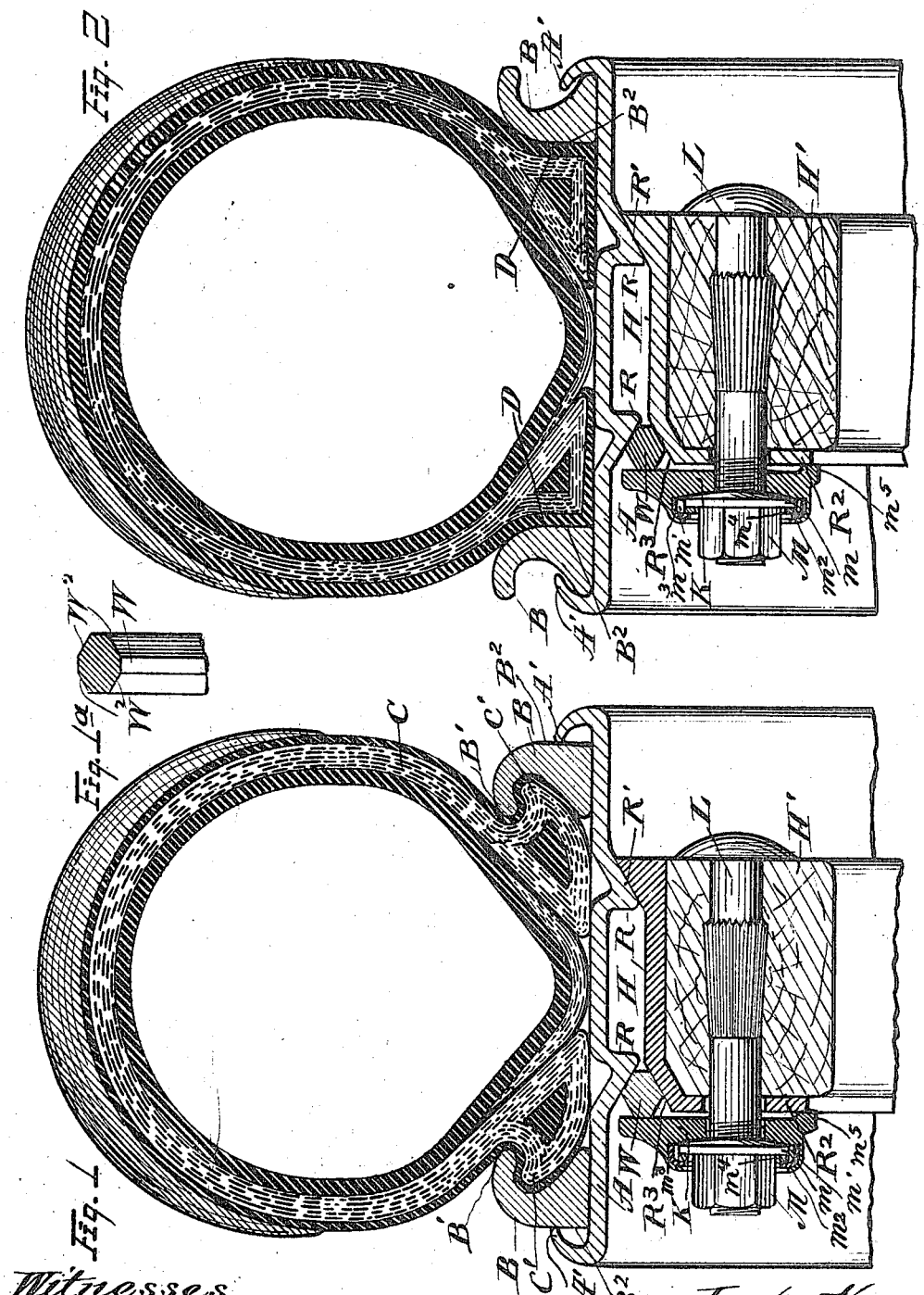

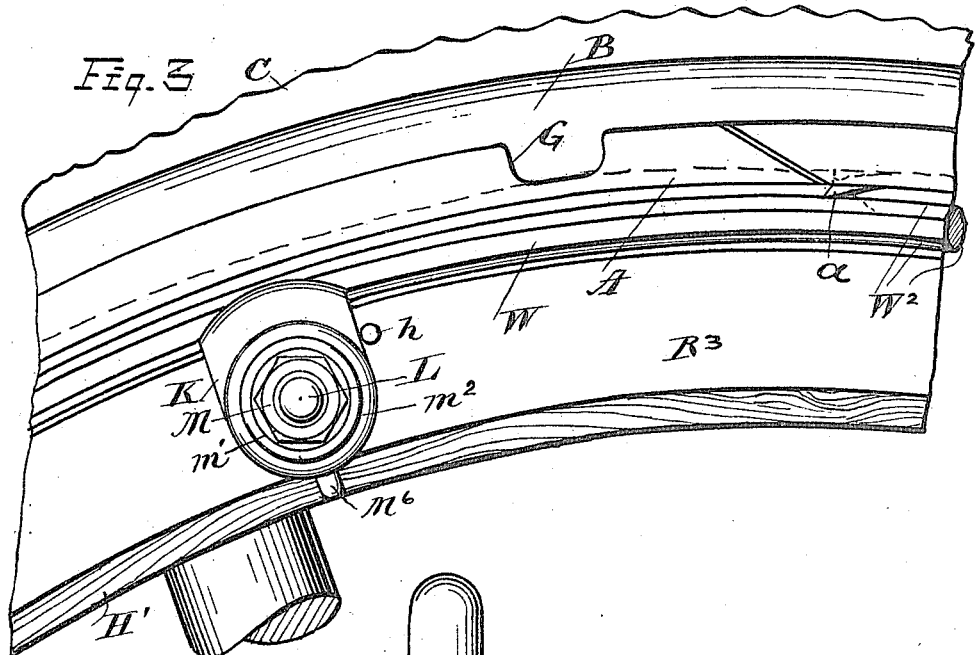
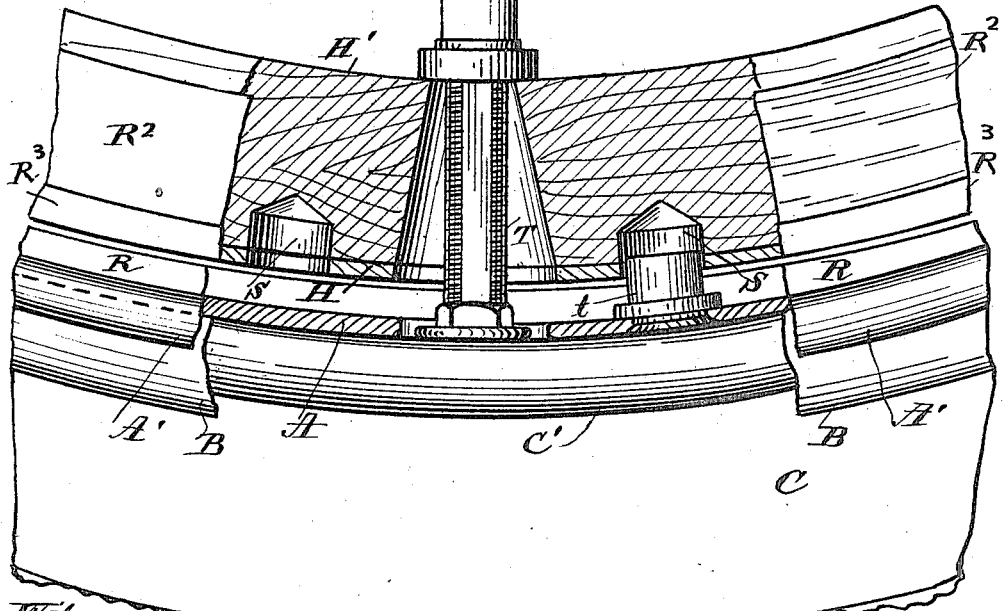

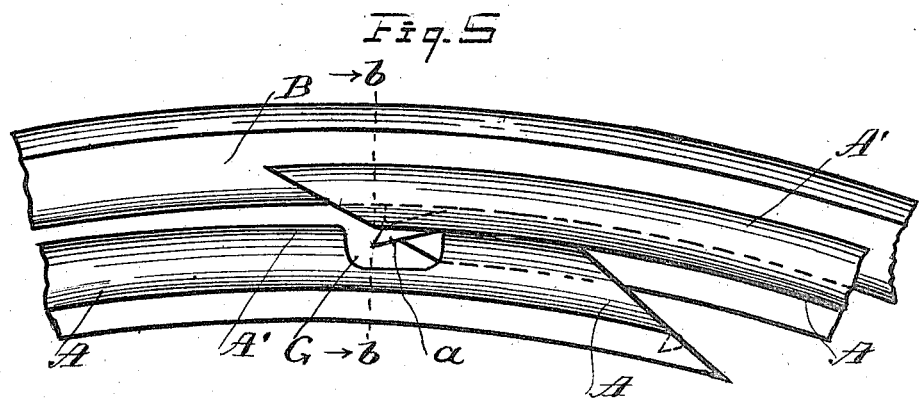
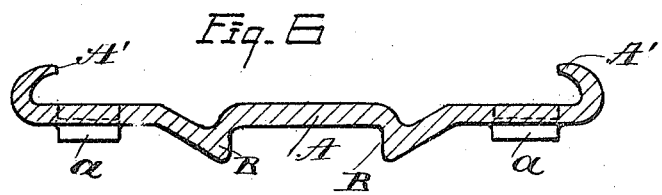
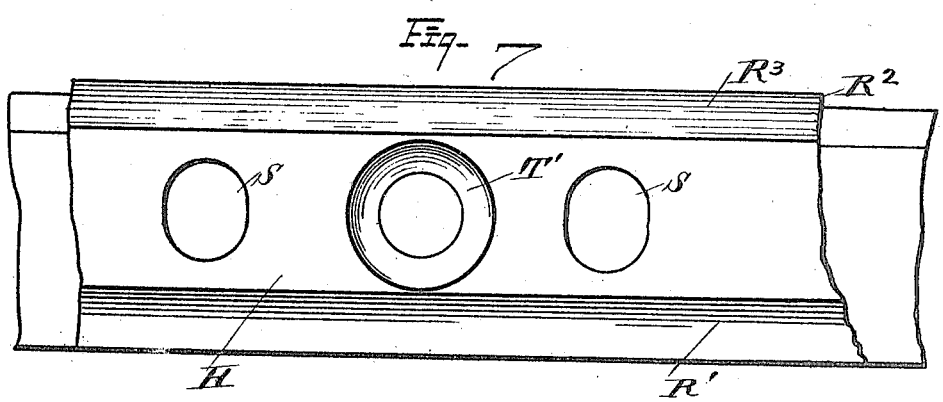
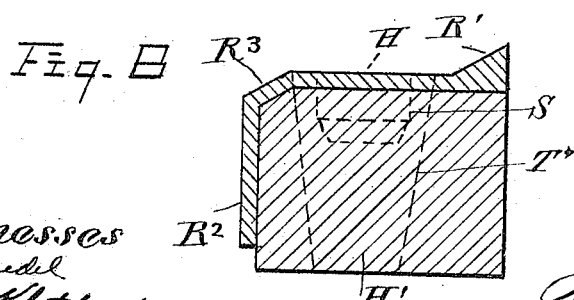

JOHN KELSEY, OF DETROIT, MICHIGAN, ASSIGNOR TO KELSEY WHEEL COMPANY, INC., OF DETROIT, MICHIGAN, A CORPORATION OF NEW YORK.

INTERCHANGEABLE SPLIT TIRE-HOLDING RIM.

1,260,397.  Specification of Letters Patent.  Patented Mar. 26, 1918.

Application filed April 9, 1914. Serial No. 830,778.

*To all whom it may concern:*

Be it known that I, JOHN KELSEY, a citizen of the United States, and resident of Detroit, in the county of Wayne and State of Michigan, have invented certain new and useful Improvements in Interchangeable Split Tire-Holding Rims, of which I hereby declare the following to be a full, clear, and exact description, such as will enable others skilled in the art to which it appertains to make and use the same.

The objects of the invention are to provide an improved and simplified construction of split tire holding rim in which one form is adapted for use interchangeably with a clencher or straight sided tire, and in which the form to be used with clencher tires will meet all requirements of the tire association for standard clencher tires.

This improved form of rim permits of the use of standard forms of endless side tire holding rings, which can be used to secure clencher tires upon the rim or in reversed position will secure straight sided tires thereon.

A further feature of the invention lies in the reversibility of the rim in relation to the felly band, thus giving it a universal use.

In this invention the rim employed as a base for the tire and tire holding rings is extended laterally to permit reversing the rings without thereby reducing the available base dimensions of a straight sided tire, whereby the same rings can be employed to secure the well known clencher tire of standard size, and also a new straight sided tire having a 10% increase in volume or oversize, and therefore requiring a greater width of base to effect this result, without appearing to the eye to be of larger size.

This result is obtained by means of inwardly turned edges to the rim which is made correspondingly wider and thus provides securing means of substantially two dimensions and can be used interchangeably with either tire.

The invention further includes integral securing means for the rim extremities, and engaging means for the rim and felly band.

The invention further consists in the combination and arrangement of parts and construction of the various details shown in the accompanying drawings and specifically pointed out in the claim.

In the accompanying drawings Figure 1 is a transverse section of a clencher tire mounted upon the improved form of rim, and showing the reversible method of engaging the rim with the felly band; Fig. 1ª is a transverse section of the double wedge clamping ring; Fig. 2 is a similar view showing the manner of adapting the same rim to a straight sided tire having a wide base; Fig. 3 is a side elevation of the assembled rim and felly band showing one of the clamps for securing the rim upon the felly band; Fig. 4 is a longitudinal section of the felly, felly band, and rim, showing a projection upon the rim which is adapted to enter interchangeably one of two openings in the felly band according to the position to prevent creeping of the rim on the band, this construction permitting reversing the position of the rim upon the band; Fig. 5 is a side elevation showing the extremities of the split rim separated after withdrawal from the felly band to permit the removal of the tire, and showing the integral means for securing the ends together when the parts are assembled; Fig. 6 is a transverse section of the rim on line $b—b$ Fig. 5; Fig. 7 is a plan view of the felly band showing openings for the valve and for the projections upon the inner surface of the tire holding rim; Fig. 8 is a transverse section of the felly and felly band.

In these views A is the rim which is adapted to retain upon its margins the tire holding rings B, B.

In Fig. 1 these rings are shown in the position for holding a clencher tire, their curved outer edges B′ extending inwardly to overlap the clencher edges C′, C′ of a tire C.

These rings are retained in position by means of inwardly curved outer edges A′, A′ of the rim A. These edges form annular flanges extending around the outer edges of the rim A and when the straight sides B², B² of the tire holding rings are turned outwardly, their outer sides will engage the extreme inwardly turned edges A′, A′ of the rim A, and the curved edges B′, B′, will overlap the clencher edges of a tire of standard dimensions as shown in Fig. 1. When the tire holding rings are reversed in position, as shown in Fig. 2, their straight sides B², B² are arranged to secure a straight sided tire at D, D and the bases of the rings which bear upon the rim A are extended and enter the annular groove formed by the overhanging flanges A', A' and thus increases the available space between the rings B, B, within which the base of the tire D extends, thus permitting the use of a straight sided tire of much broader base than would be possible with the use of straight marginal flanges upon the rim A, and will enable the user to increase the capacity of the straight sided tire with the use of the same rim upon which he can mount a clencher tire if desired. This construction increases the value of the rim and gives it an interchangeable and double use.

This form of rim is split upon a plane inclined to the axis of the wheel as shown in Figs. 3 and 5 to make it possible to collapse the same when the tire is placed upon it or withdrawn therefrom.

To lock the parts in place when assembled, integral detents or wedge shaped tongues $a$, $a$, are cut from the body of the rim in one extremity closely adjacent to the inclined end, and when the opposed inclines are drawn into contact with each other the wedge shaped tongues upon one extremity will spring underneath the other extremity and secure the extremities in alinement with each other.

To disengage the extremities after the rim is removed from the wheel, a groove G is cut in the edge of one of the flanges A', A' and a tool is inserted underneath one of the rings B and by prying one end of the rim downward the locking tongues can easily be disengaged and the rim will collapse sufficiently to permit the removal of the tire.

The tongues $a$, $a$, are preferably drawn to a relatively sharp edge to make their action prompt and efficient in securing the ends together.

The rim A is assembled upon a felly band H which is secured to the felly H' of the wheel. The engaging surfaces of the rim and felly band are so constructed that the rim can be sleeved over the band from either side, thus making it substantially universal in use.

To accomplish this result the rim is provided with duplicate annular integral ribs R, R, on its inner circumference. The outer faces of these ribs are reversely inclined and are inclined toward the center of the wheel and are equally spaced from the center of the rim.

The felly band is provided with a corresponding annular marginal incline R' in its inner edge, inclined toward the center of the wheel, against which one of the inclines upon the rim is seated when the rim is put in place.

The outer edge of the felly rim is provided with an inwardly turned flange $R^2$ and also with an incline $R^3$ in the same direction as the incline R'.

One of the inclines R upon the rim will come opposite to the incline $R^3$ in the felly band, and a wedge ring W having corresponding inclined surfaces $W^2$, $W^2$, engages with the opposed inclines upon the rim and felly band.

The inclines are preferably duplicated upon two sides of the wedge ring so that it will be reversible and no mistake can be made in placing the same.

The rim and felly band are clamped together by means of clamps K which are suitably spaced apart around the felly band and are retained in position by means of bolts L, L, which pass through the felly H'. Nuts M are adjustable upon the outer ends of the bolts and are preferably provided with flanges $m$ which are inclosed within the recesses $m'$ in the clamps K.

The margins of the recesses are turned inwardly at $m^2$ to retain the nuts and prevent them from escaping from the clamps, an annular sheet metal cup shaped washer $m^3$ in each recess prevents excessive friction as the nut is turned and a split ring shaped spring $m^4$ retains the clamp temporarily at any angle at which it is placed.

Each clamp is provided with a heel $m^5$ which rests upon the downwardly turned flange $R^2$ and the clamp rocks upon this heel when pressed against the double wedge. To facilitate the rocking action and so as not to cramp the nut, the heel should not be placed farther from the bolt than the margin of the nut, and the inner surfaces of nut and the recess in the clamp are preferably crowned or correspondingly curved so as to form a near approach to a ball bearing for the nut.

Lugs $M^6$, $M^6$ upon the nuts and pins inserted at $h$, $h$, in the flange of the felly rim prevent the clamps from being turned too far when separating the parts and insure their being all turned alike, thus facilitating the assembling of the parts.

To prevent the rim from moving circumferentially upon the felly band the band is provided with a radial opening S in each side of the usual opening T' for the valve T as shown in Fig. 4, and a pin $t$ is secured in the rim which is inserted in one of these openings when the parts are assembled.

The two openings are equally distant from the center of the valve opening so that the pin will enter one of these openings whichever side of the rim is first presented to the felly band.

The rim is in this manner universal in its mode of application to the felly band and also can be interchangeably used with a standard clencher tire and with a straight sided tire of greater base extension than could be used with an ordinary rim.

Having described the invention what I claim as new and desire to secure by Letters Patent is:

In a split rim, a body portion provided with overlapping extremities and integral inclined locking tongues struck out and extending downwardly from one extremity, and engaging the other extremity, said overlapping extremities having corresponding inclined meeting surfaces arranged to facilitate separating and reuniting the extremities.

JOHN KELSEY.

In presence of—
  L. H. McCracken,
  Wm. M. Monroe.